UNITED STATES PATENT OFFICE.

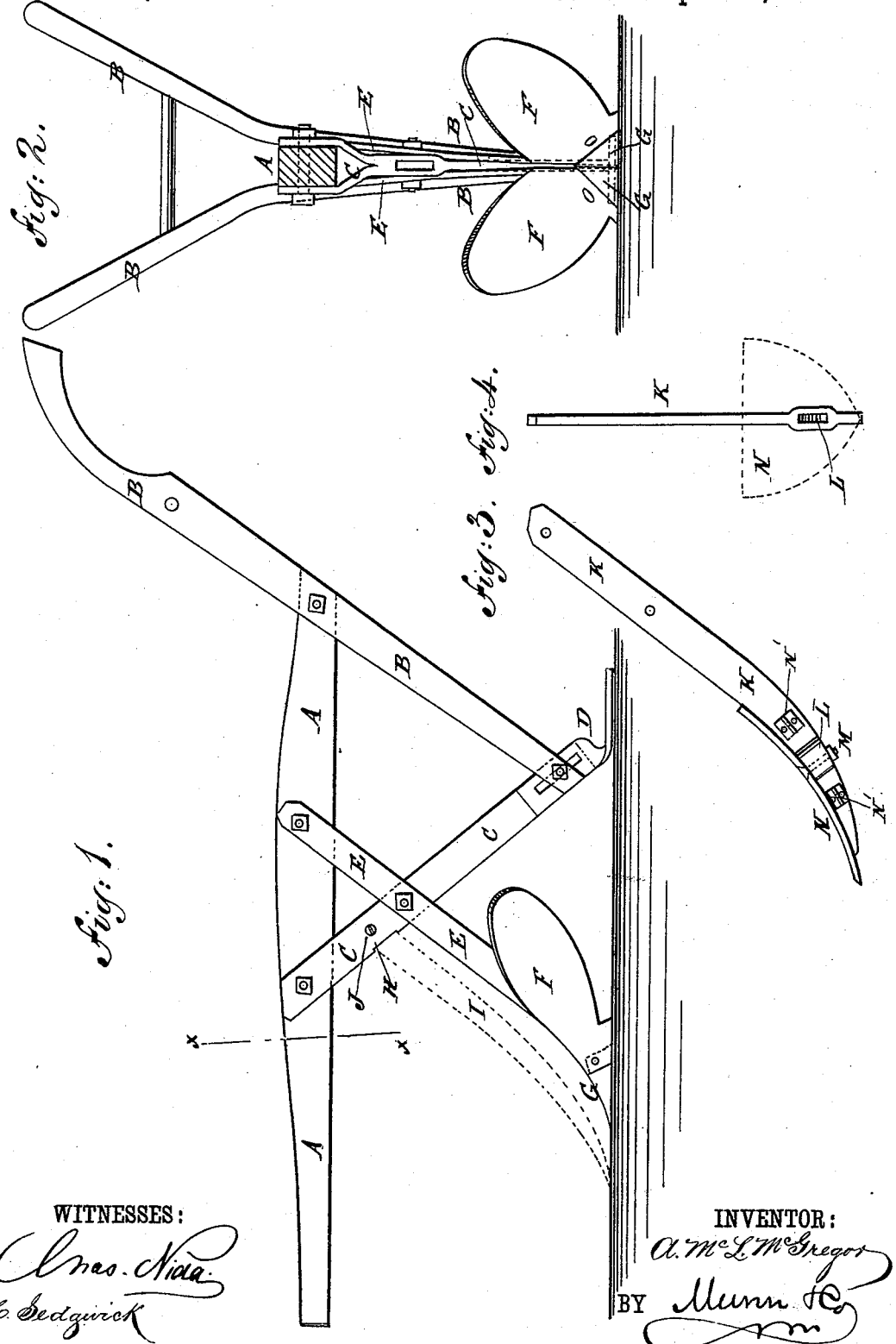

ANDREW McLEAN McGREGOR, OF MOSS POINT, MISSISSIPPI.

PLOW.

SPECIFICATION forming part of Letters Patent No. 340,140, dated April 20, 1886.

Application filed June 11, 1885. Serial No. 168,410. (No model.)

*To all whom it may concern:*

Be it known that I, ANDREW McLEAN MCGREGOR, of Moss Point, in the county of Jackson and State of Mississippi, have invented a new and useful Improvement in Plows, of which the following is a full, clear, and exact description.

Reference is to be had to the accompanying drawings, forming a part of this specification, in which similar letters of reference indicate corresponding parts in all the figures.

Figure 1 is a side elevation of one of my improved plows. Fig. 2 is a front elevation of the same, shown as a right-and-left plow, the beam being shown in section through the line $x\ x$, Fig. 1. Fig. 3 is a side elevation of a standard for a bull-tongue or shovel plow, the plow being shown in place. Fig. 4 is a front elevation of the standard, and showing a plow in dotted lines.

The object of this invention is to provide plows constructed in such a manner that they can be readily adjusted for use as a right or a left plow, or a right-and-left plow, as may be required, and which shall be simple in construction, strong, and durable.

The invention consists in the construction and combination of various parts of the plow, as will be hereinafter fully described, and then pointed out in the claims.

A is the plow-beam, to the opposite sides of the rear end of which are attached the handles B. To the middle part of the beam A is bolted the forked upper end of the bar C, which inclines to the rearward, and to which, at a little distance from its lower end, are bolted the lower ends of the handles B. To the lower end of the bar C is secured, by the same bolt that secures the lower ends of the handles B to the said end, the shank of the foot D, which is bent to the rearward into a horizontal position, so as to slide along the bottom of the furrow opened by the plow and give steadiness to the said plow when at work. The shank of the foot D is slotted longitudinally to receive the fastening-bolt, so that the said foot can be readily adjusted higher or lower, to regulate the pitch of the plow.

To the middle part of the stock-bar C and the rear part of the beam A is bolted the plow-standard E, to the lower end of which is secured a turn-plow, F. The plow F is made in one piece, except the point G, which is made separate, and is bolted to the said plow in the ordinary manner, so that the said point, when worn, can be readily replaced with a new one.

The plow F may be a right turn-plow or a left turn-plow; or two standards, E, can be used at the same time, one being provided with a right plow and the other with a left plow, as shown in Fig. 2, in which case each plow can have its own point; or a double point can be used and attached to both plows at the same time, as shown in Fig. 2.

With the arrangement last described, the plow can be used as a double sweep for cleaning out the space between two rows of plants and dirting the adjacent sides of the said two rows at one passage across the field.

In the stock-bar C, a little above its point of intersection with the standard E, is formed a mortise, H, to receive the shank of the colter I, as shown in dotted lines in Fig. 1, and which is secured in place by a screw or bolt, J, or other suitable means.

When it is desired to use a bull-tongue plow, a shovel-plow, a scooter, or other plow without a mold-board, the standard E is replaced by a standard, K, having a mortise or slot, L, to receive the bolt M, that fastens the said plow N to the said standard K.

Lugs N' can be bolted to the sides of the standard K, above and below the slot L, so that a right or a left turning-plow or a right-and-left turning-plow can be used upon the said standard K.

With this construction the beam A, handles B, and bar C form the plow-stock, and remain unchanged, while the standard E and plow F are changed as the work to be done may require.

The various parts of the plow can be made small and the implement used as a hand-plow for garden purposes, if required.

Having thus fully described my invention, I claim as new and desire to secure by Letters Patent—

1. In a plow, the combination, with a beam, of a rearwardly-inclined bar having its upper end secured to the beam and its lower end provided with a rearwardly-projecting foot, a plow-standard secured to said beam and inclined bar, and handles secured to the beam and lower end of the inclined bar, substantially as herein shown and described.

2. In a plow, the combination, with the beam A, handles B, and stock-bar C, of the foot D, having slotted shank, substantially as herein shown and described, whereby the said foot can be readily adjusted to regulate the pitch of the plow, as set forth.

3. In a plow, the combination, with the beam A, handles B, and rearwardly-inclined bar C, of the rearwardly-projecting foot D, slotted and secured to the lower end of the said inclined bar, the bar and handles being secured by the same bolt, substantially as herein shown and described.

4. In a plow, the combination, with the beam A, handles B, stock-bar C, having mortise H and provided with a foot, D, and one or more plow-standards and plows, E F, of the colter I and screw or bolt J, substantially as herein shown and described, whereby the said colter will be firmly supported and securely held, as set forth.

ANDREW McLEAN McGREGOR.

Witnesses:
HENRY A. VAUGHAN,
EUGENE LOUIS CASTANERA.